United States Patent
Welch, Jr. et al.

(10) Patent No.: US 6,240,452 B1
(45) Date of Patent: *May 29, 2001

(54) METHOD AND APPARATUS FOR MONITORING FILE TRANSFERS AND LOGICAL CONNECTIONS IN A COMPUTER DATABASE FEATURING A FILE TRANSFER RECORD DATABASE

(75) Inventors: Frank K. Welch, Jr., Salt Lake City; Christopher S. Thomas, Orem, both of UT (US); Jay E. Sternberg, Glendale; Thomas M. Baggleman, Phoenix, both of AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/133,014

(22) Filed: Aug. 12, 1998

Related U.S. Application Data

(63) Continuation of application No. 08/040,455, filed on Apr. 1, 1993, now Pat. No. 5,862,335.

(51) Int. Cl.⁷ .................................................... G06F 17/30
(52) U.S. Cl. ...................... 709/224; 709/223; 709/238; 709/240; 709/241; 709/242
(58) Field of Search ............................. 707/10; 709/224, 709/223, 238, 240, 241, 242

(56) References Cited

U.S. PATENT DOCUMENTS

| | | |
|---|---|---|
| 4,022,982 | 5/1977 | Hemdal . |
| 4,620,066 | 10/1986 | Bushnell et al. . |
| 4,706,080 | 11/1987 | Sincoskie . |

(List continued on next page.)

OTHER PUBLICATIONS

IBM Technical Disclosure Bulletin, "Network Analysis Monitor", Nov. 1976.*
IBM Technical Disclosure Bulletin, "Network Monitor", Jul. 1982.*

*Primary Examiner*—Wayne Amsbury
*Assistant Examiner*—William Trinh
(74) *Attorney, Agent, or Firm*—Blakely, Sokoloff, Taylor & Zafman LLP

(57) ABSTRACT

A method of monitoring logical connections in a computer network is described. All packets exchanged via the network are intercepted and analyzed. Upon receipt of a packet, a connection management engine determines whether packet is part of an existing logical connection. If it is not, a new record is created and stored in a connection record database. Otherwise, the existing record for the logical connection in the connection record database is updated.

Also described is a method of monitoring file transfers in a computer network. File transfers are monitored using an file transfer record database, which allows each packet of the file transfer to be placed in proper context. Upon interception of a packet, an application management engine (AME) first determines whether the packet is part of a file transfer. If it is not, the AME ignores the packet. On the other hand, if the packet is part of a file transfer, then the AME determines whether if the packet is part of a new file transfer or a one of a multiplicity of existing file transfers. The AME creates a new record if the packet is the start of a new file transfer. If the packet is part of an existing file transfer, then the AME searches the file transfer record database to locate the record for the file transfer, which the packet is part of. Once located, the record is updated.

Apparatus for monitoring file transfers and logical connections are also described.

12 Claims, 9 Drawing Sheets

U.S. PATENT DOCUMENTS

| | | |
|---|---|---|
| 4,737,953 | 4/1988 | Koch et al. . |
| 4,737,983 | 4/1988 | Frauenthal et al. . |
| 4,817,080 * | 3/1989 | Soha ................................... 370/252 |
| 5,038,345 | 8/1991 | Roth . |
| 5,101,402 * | 3/1992 | Chiu et al. ............................ 370/17 |
| 5,136,580 | 8/1992 | Videlock et al. . |
| 5,187,710 | 2/1993 | Chau et al. . |
| 5,222,064 | 6/1993 | Sagawa . |
| 5,245,614 | 9/1993 | Gutman et al. . |
| 5,428,616 | 6/1995 | Field et al. . |
| 5,430,709 * | 7/1995 | Galloway ............................. 370/241 |
| 5,459,713 | 10/1995 | Curtis . |
| 5,500,860 * | 3/1996 | Perlman et al. ..................... 370/401 |
| 5,610,595 * | 3/1997 | Garrabrant et al. ........... 340/825.52 |

\* cited by examiner

METHOD AND APPARATUS FOR MONITORING FILE TRANSFERS AND LOGICAL CONNECTIONS IN A COMPUTER DATABASE FEATURING A FILE TRANSFER RECORD DATABASE

This is a continuation of appln Ser. No. 08/040,455 now U.S. Pat. No. 5,862,335, filed Apr. 1, 1993. I hereby claim the benefit under Title 35, United States Code, Section 120 of the appln Ser. No. 08/040,455, now U.S. Pat. No. 5,862,335, filed Apr. 1, 1993.

FIELD OF THE INVENTION

The present invention pertains to the field of computer networks. More particularly, the present invention pertains to a method and circuitry monitoring file transfers and logical connections in a computer network.

BACKGROUND OF THE INVENTION

Computer networks connect multiple personal computers and computer workstations together, allowing them to exchange information and share applications programs. Computer networks can be quite large, connecting hundreds of computers. Consequently, administering and managing them can be a complex task.

To administer, monitor, and repair computer networks, many network managers use prior network management systems. Prior network management systems tend to use a manager module, a management information database, and agent components. Agent components gather information about the computer network, such as the number and size of packets transmitted, number or frequency of corrupt packets, network usages sorted by protocol, workstation or protocol, and which workstations communicate with which servers. Agents periodically send this information to the manager module. The manager module takes the information and stores it in the management information database in the form of objects.

Even using prior network management systems, network managers need to be technically knowledgeable to diagnose the problems encountered in computer networks and to predict the future needs of their networks. This is because prior network management systems gather information at a fairly low, hardware level. As a result, prior network management systems treat each packet exchanged via the computer network as an atomic event. Thus, using prior network management systems it is not possible to determine whether or not data is actually being exchanged during a connection or which application programs are being used.

SUMMARY OF THE INVENTION

The present invention provides a method of monitoring logical connections in a computer network. According to the present invention, all packets exchanged via the network are intercepted and analyzed. Upon receipt of a packet, it is determined whether the packet is part of an existing logical connection. If it is not, a new record is created for the logical connection that the packet starts. The new record is then stored in a connection record database if the packet is part of an existing logical connection. Otherwise, the record for the logical connection is updated.

The present invention also provides a method of monitoring applications programs by monitoring the applications programs' file transfers within a computer network. File transfers are monitored using an file transfer record database, which allows each packet of the file transfer to be placed in proper context. Upon interception of a packet, it is first determined whether the packet is part of an ongoing, existing file transfer. If the packet is part of a file transfer, the packet is examined to see if it is the start of a new file transfer or is part of one of the multiplicity of ongoing, existing file transfers. Otherwise, the packet is discarded.

A new record is created if the packet is the start of a new file transfer. If the packet is part of an existing file transfer, then the file transfer record database is searched to locate the record for file transfer that the packet is part of. Once located, the record is updated to reflect the time of last activity and by increasing the total bytes exchanged by the number of bytes of data associated with the packet.

The present invention also provides apparatus for monitoring file transfers and logical connections.

Other objects, features, and advantages of the present invention will be apparent from the accompanying drawings and the detailed description that follows.

BRIEF DESCRIPTION OF THE FIGURES

The present invention is illustrated by way of example and not limitation in the figures of the accompanying drawings in which references indicate similar elements and in which.

DETAILED DESCRIPTION

Figure 1:
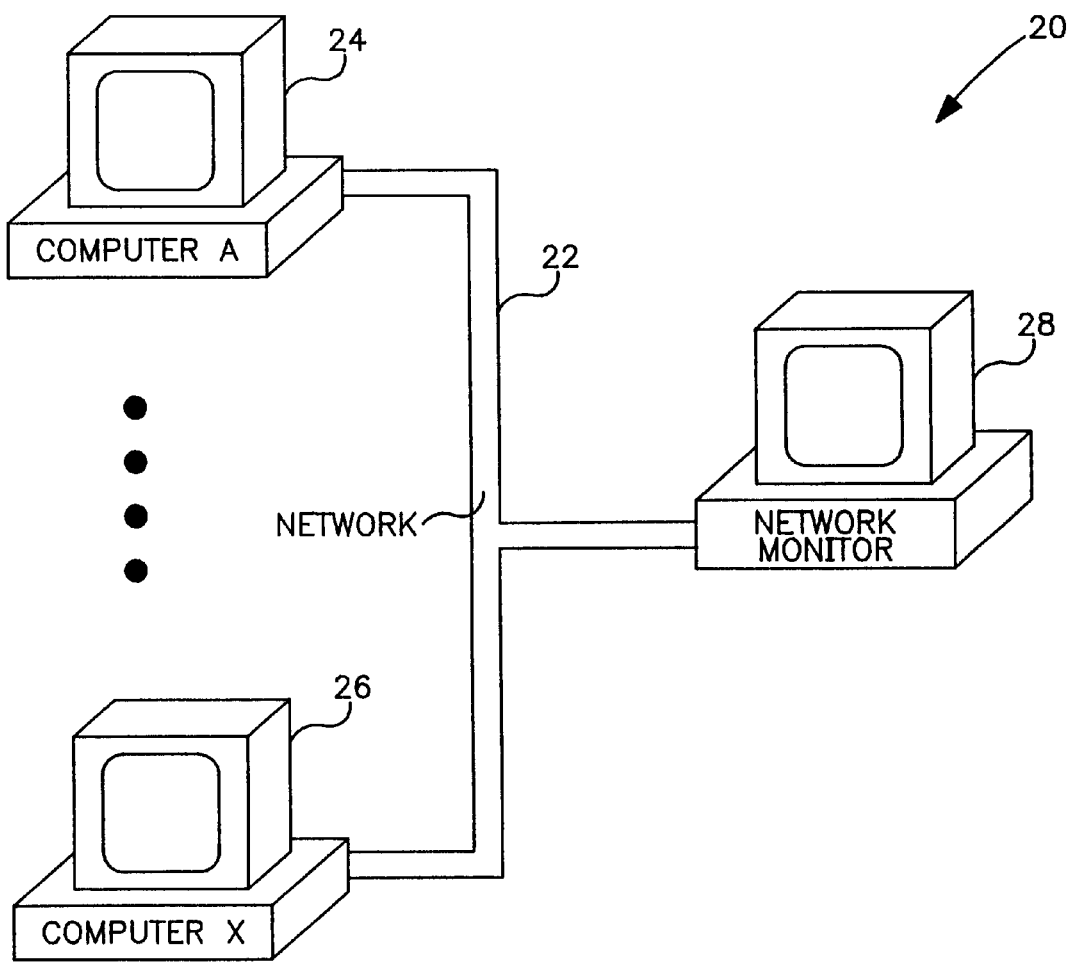
FIG. 1 is a block diagram of a computer network including a network monitor.

FIG. 1 illustrates computer network 20, which enables computers to exchange information via network 22. Computer network 20 may include many computers, though only two, 24 and 26, are shown. These computers, also referred to as stations, may be user workstations or servers, which make available application programs to other stations within computer network 20. Each station is capable of using many application programs. Stated another way, each station may use, or include, many network entities.

Computer network 20 also includes network monitor 28 of the present invention. Briefly described, network monitor 28 monitors logical connections and file transfers between stations within computer network 20. Network monitor 28 analyzes both file transfers and logical connections by determining the context of each packet in relationship to earlier packets exchanged between two stations. Network monitor 28 uses a network management engine and a network management database to perform this function.

Figure 2:
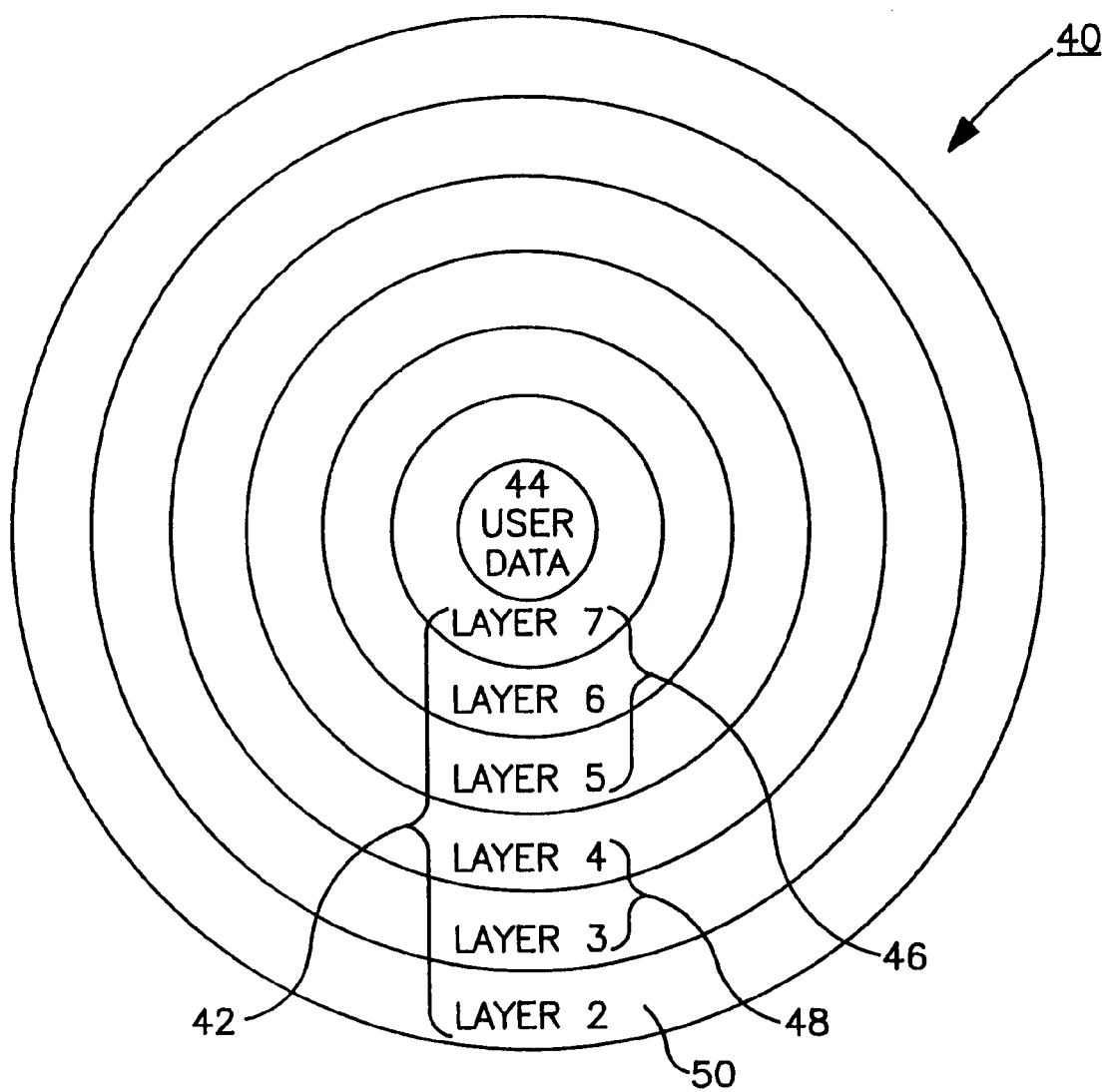
FIG. 2 is a diagram of the layers of protocol control information contained in a packet.

Stations within computer network 20 exchange information in the form of packets. Each packet includes protocol control information and user data. The protocol control information (PCI) 42 has several layers, which may be thought of as layers of an onion surrounding user data 44 at its center, as shown in FIG. 2. FIG. 2 illustrates PCI 42 according to the OSI Seven Layer model. The upper layers 46 are layers 7, 6, and 5. Upper layers 46 provide functions that are closest to the applications programs used. These layers 46 control the final processing of data, both ingoing and outgoing. Layer 7, the application layer, controls standard file transfers, electronic messaging, and virtual terminal services. Layer 6 is also referred to as the presentation layer; it puts data into a format a station can understand. Layer 5, the session layer, performs dialogue control. Layers 4 and 3 form the middle layers 48. Middle layers 48 control the detection of errors during packet transmission and/or reception. Layer 4 is called the transport layer and it ensures that data is accurately sent and received. Layer 3 is responsible for routing and relaying data to its proper destination. According to the OSI model layer 3 is called the network layer. Layers 2 and 1 form the lower levels. Layer 2 50 is called the datalink layer and it transforms data into electronic pulses and vice-versa. Layer 1 is implemented in hardware, hence its name, the physical layer. Layer 1 interfaces directly with the hardware; e.g. fiber optic cable or wire, of network 22.

According to the OSI model each packet may include seven layers of PCI 42, but need not necessarily include all seven layers. For example, layer 1 through layer 3 information is sufficient for packets that are related solely to routing, changing network topologies, and errors in the computer network infrastructure. In contrast, data transfer between stations requires at least the information of layers 1–4.

The OSI model is one way of describing PCI 42 of a packet. However, most commercially available network protocols do not conform exactly to the OSI model. Despite this, most protocols can be modeled as an upper layer, middle layer, and lower layer, just as the OSI model has been described.

By examining PCI 42 of a packet, network monitor 28 is able to analyze logical connections and file transfers between stations of computer network 20. Monitoring of logical connections can be performed by examining the information of layers 2, 3, and 4. The existence of layer 4 information in a packet indicates that a logical connection between two stations exists. As used herein, a logical connection is a connection between two stations during which data packets are exchanged and responded to appropriately. An analogy illustrates this concept. An English speaking woman makes a phone call to a Russian speaking man. Once the phone is picked up a physical connection exists between them. However, because the man and woman do not speak a common language, no data is actually exchanged and a logical connection cannot be established.

Monitoring of file transfers can be done by examining the information associated with layers 2, 3, and 7. The existence of layer 7 information indicates that two applications programs are exchanging information.

Figure 3:
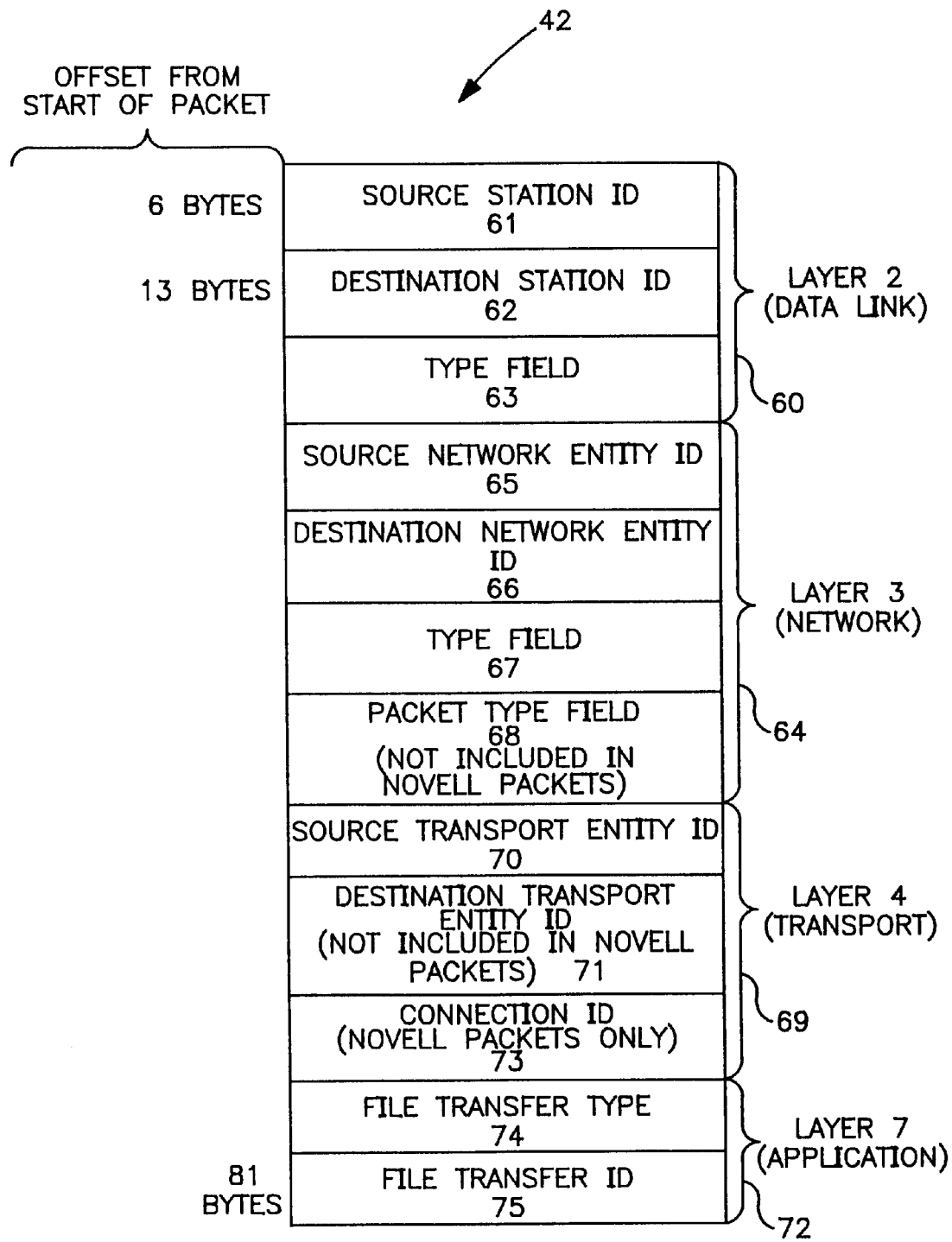
FIG. 3 is a diagram of the packet control information of a packet.

FIG. 3 illustrates in block diagram form some of the protocol control information 42 available in layers 2, 3, 4, and 7 of a packet. Layer 2 information 60 includes three fields according to the Ethernet protocol, which is used almost universally for layer 2. One field 61 of layer 2 identifies the station that is the source of the packet. Another layer 2 field 62 identifies the station that is the packet destination. The type field 63 of layer 2 identifies the protocol used in layer 3. The layer 3 protocol may be Banyan, Novell, TCP-IP, or Appletalk.

Layer 3 information 64 includes at least four fields 65, 66, 67, and 68, regardless of the protocol used in that layer. One field 65 identifies the network entity of the source station. That is, field 65 identifies the program being used by the source station. A second field 66 identifies that network entity, i.e., the programs being used by the destination station. The third layer 3 field 67 is a type field that identifies the protocol used by layer 4. Layer 4 also may use a Novell, TCP-IP, Banyan or Appletalk protocol. The fourth field 68 included in the layer 3 information is the packet function field. Several types of packets have been defined are, but most computer network traffic involves data transfer and router maintenance packets.

Layer 4 information 69 includes at least three fields, regardless of the protocol used. The first field 70 identifies the transport entity being used by the source station. Stated another way, the first field 70 identifies the route used in transporting packets from the source station through network 22 to the destination station. The second field 71 identifies the transport entity being used by the destination station. The third field 73 included in the layer 4 information 69 is a connection id. The connection id field 73 uniquely identifies the connection to which the packet relates. This field 73 is unique to Novell packets. Layer 4 information 69 may also include a data acknowledgment field, which is not shown. The data acknowledgment, or "ACK", informs a sender of receipt of a packet. The ACK typically includes the sequence number of the packet received. Using these sequence numbers, it is possible to detect out-of-sequence errors and to recover from them.

Layer 7 information 72 includes at least two fields. In file transfer packets, the first field 74 identifies the type of the file transfer. The five file transfer types are: open, read, write, close, and create. The second field 75 included in layer 7 information is the identifier. This field uniquely identifies the file to which the file transfer relates.

Figure 4:
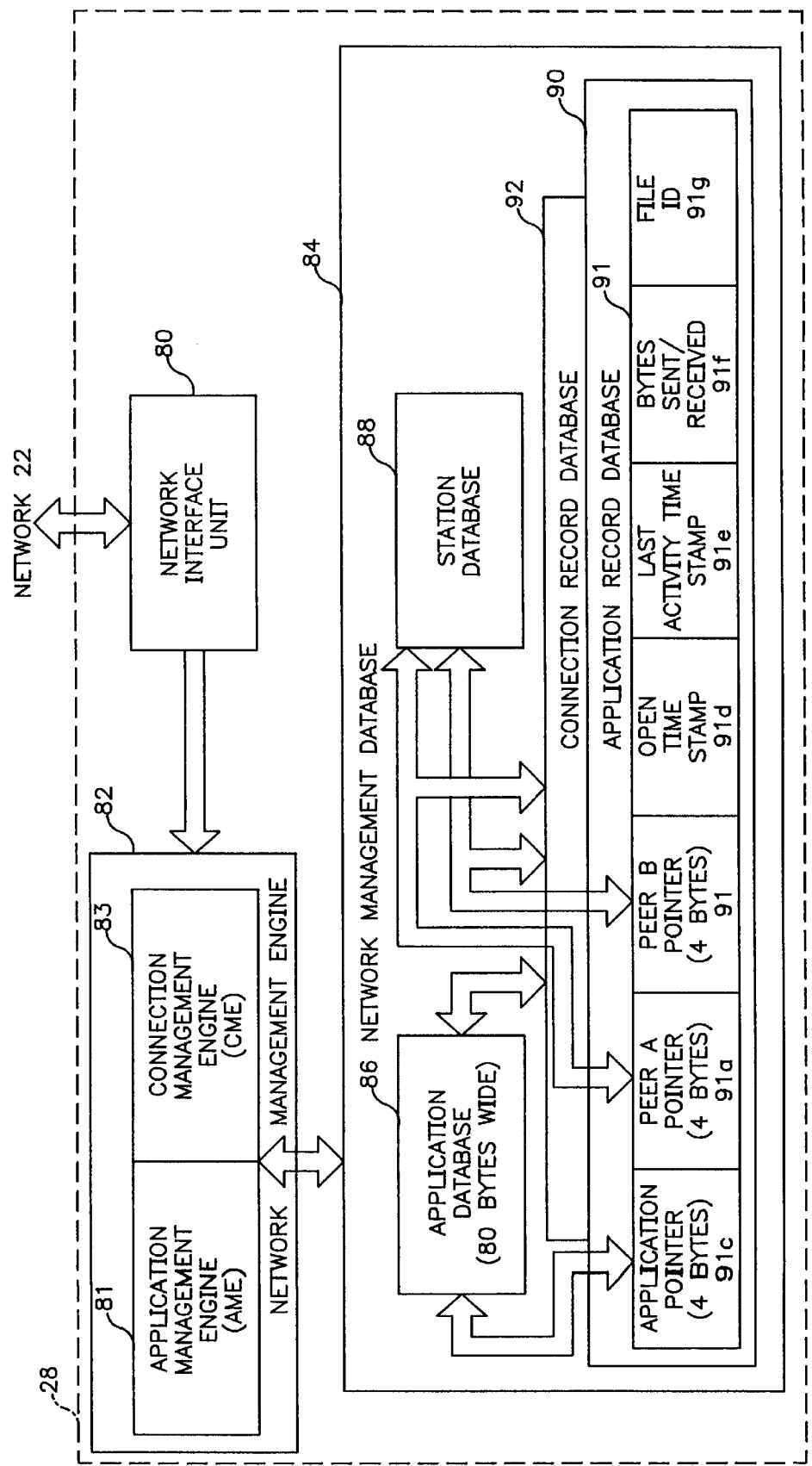
FIG. 4 is a block diagram of a network monitor.

FIG. 4 illustrates in block diagram form network monitor 28 of the present invention. Network monitor 28 is realized using a DOS or DOS/windows based computer workstation. As is typical, the computer workstation includes a central processing unit, such as a microprocessor, and internal memory. The computer workstation may be a headless probe; i.e. a computer without a monitor. In that situation another computer with a monitor may be used to visually display the information archived by network monitor 82. The computer workstation also includes network interface unit 80, which intercepts packets on network 22 and stores copies of them in memory. Network interface unit 80 may be an Ethernet or Token Ring interface card.

The operation of the computer workstation is modified by network management engine 82 and network management database 84, which are implemented in software and may be stored in the internal memory of the computer workstation or on other machine readable media. Network management engine 82 analyzes the PCI 42 of a packet just stored in memory upon receipt of an interrupt from network interface unit (NIU) 80. By analyzing PCI 42 of a packet in conjunction with network management database 84, network management engine 82 is able to determine the context of a packet. That is, network management engine 82 determines whether the packet is of interest and whether it is part of an existing or new connection. By doing so, network management engine 82 is able to analyze logical connections and file transfers, not just individual packets.

Network management engine 82 includes at least one management engine, either application management engine (AME) 81 or connection management engine (CME) 83. Network management engine 82 may also include a single management engine that allow analysis of both logical connections and file transfers. The particular engine chosen will vary depending on the needs and sophistication of the network manager using network monitor 28.

AME 81 is a state machine that determines which applications programs are being used by which stations, and how often. AME 81 performs its function by determining the context of each file transfer packet exchanged during a connection. As such, AME 81 is well suited for a non technically trained network manager trying to determine how computer network 20 is being used and how computer network 20 should grow. Stated another way, AME 81 is useful for performance and accounting management.

Like AME 81, CME 83 performs its functions by determining the context of each packet exchanged during a connection. However, the function of CME 83 differs from AME 81. CME 83 monitors logical connections between stations to determine which stations communicate with each other, when connections begin and end, and how much information is exchanged. CME 83 is thus useful for fault management, security management, accounting management, and performance management. CME 83 allows a network manager to determine the cause of a user's inability to retrieve information from a file server. For example, if CME 83 detects logical connections between the server and other computer users, then the user's inability to communicate may be due to a hardware problem with the user's computer. CME 83 facilitates monitoring of security privileges by recording which stations communicate with each other. Armed with this information, the network manager can disconnect stations that are violating their security privileges. Also because CME 83 maintains a record of logical connections it can be used to bill computer users according to the number of calls made and their length.

Network management database 84 is a group of a group of three or four databases. Regardless of the configuration of network management engine 82, network management database 84 includes application database 86 and station database 88. Application database 86 includes an 80 byte wide identifier for each application program available within computer network 20. Similarly, station database 88 includes an identifier for each station within computer network 20. These two databases 86 and 88 are used by both record databases 90 and 92. File transfer record database 90 includes one record per file transfer within computer network 20. In contrast, connection record database 92 maintains a record for each logical connection existent within computer network 20. The content of records for both record database 90 and 92 will be discussed in conjunction with their associated management engines.

Network monitor 28 may also include an archive for storing records of past connections and a monitor for visually displaying information. The manner in which information by the archive is displayed depends upon the goal of the network manager: fault management, security management, or performance management.

Figure 5:
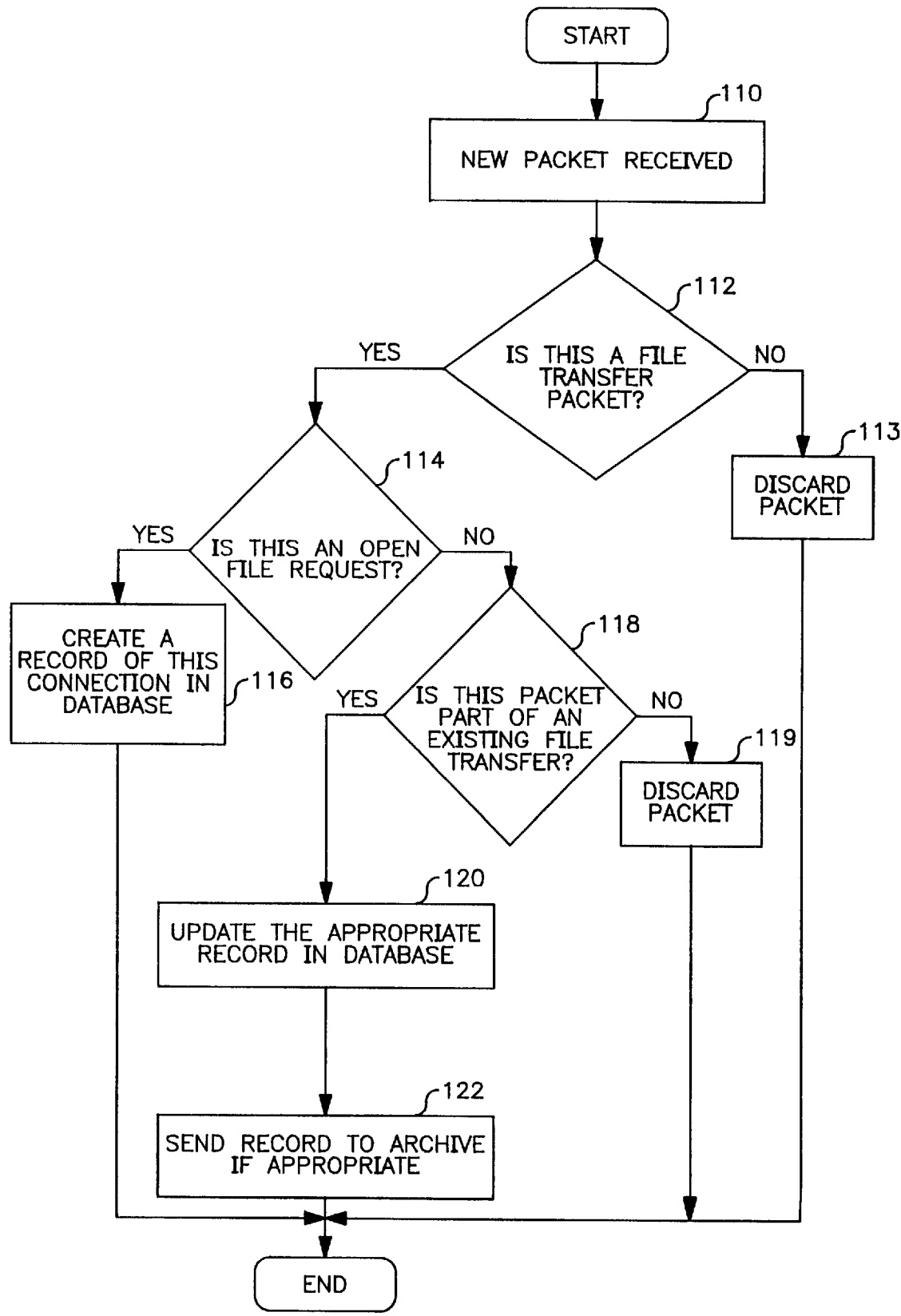
FIG. 5 is a flow diagram of an application management engine.

FIG. 5 illustrates in flow diagram form an overview of AME 81. Upon receipt of a packet from NIU 80 in step 110, AME 81 proceeds to step 112 to examine the PCI 42 of the packet. If the packet is not a file transfer packet, AME 81 discards, or ignores, the packet in step 113. On the other hand, if the packet is part of file transfer AME 81 branches to step 114 to begin classifying the packet.

Classification of the packet begins by determining whether it relates to an open file request. If it does, then AME 81 branches from step 1184 to step 116 to create a new file transfer record.

FIG. 4 illustrates the various fields created for during step 116 each record 91. For each file transfer record 91, AME 81 notes the identity of the two stations involved in the file transfer using peer A pointer field 91*a* and peer B pointer field 91*b*. Note that the stations are not designated source and destination, but peer A and peer B. This is because peer A may be the source and peer B the destination station in one packet while in the next packet the source and destination roles may be reversed. AME 81 identifies the peer stations using pointers into station database 88. Using pointers rather than the unique identifiers for each station, greatly reduces the memory required to monitor each file transfer. AME 81 determines which applications program is involved in the file transfer by examining the source or destination network entity identifier fields 65 or 66. AME 81 notes that applications program in application pointer field 91*c*. As with peer pointers 91*a* and 91*b*, storing a pointer into applications database 86 greatly reduces memory requirements of network monitor 28. AME 81 notes the time at which the file transfer began in the open timestamp field 91*d*. The file transfer record 91 also includes a file identifier field 91*g*, which uniquely identifies the file transfer. AME 81 also notes the number of bytes of user data contained within the packet in the bytes sent/received field.

During step 118 AME 81 determines whether the packet currently being examined is part of an existing file transfer. AME 81 makes this determination by examining both the PCI 42 of the packet and file transfer record database 90.

AME 81 advances to step 118 from step 116 if the packet does not relate to an open file request. There AME 81 determines if the packet is part of an existing file transfer. If the packet is not, AME 81 discards the packet in step 119.

On the other hand, if AME 81 identifies that packet as part of an existing file transfer AME 81 branches to step 120. There 120 AME 81 updates the file transfer record 91 for the appropriate file transfer. In particular, both the last activity timestamp field 91*e* and bytes sent/received are revised. AME 81 changes field 91*e* to reflect the current time and adds the number of bytes associated with the packet to the number in field 91*f*.

Finally, in step 122, AME 81 sends selected file transfer records 91 to the archive. File transfer records 91 are sent to the archive when the file transfer has ended by a "rude interrupt;" that is a long period of time has past without the exchange of a packet for the particular file id. AME 81 makes this decision by comparing the last activity timestamp field 91*e* to the current time. AME 81 may also send an file transfer record 91 to the archive when the PCI 42 of a packet indicates the end of the file transfer. When file transfer records 91 are sent to the archive depends upon the needs and wishes of the network manager. To monitor performance, only records of completed file transfers monitor are needed. On the other hand, if the network manager wishes to analyze a problem as it occurs, copies of updated file transfer records 91 should be sent to the archive each time a record 91 is updated.

Using the file transfer records 91 in the archive, the network manager can determine which applications programs are being used, by which stations, for how long, and the rate at which file transfers are accomplished.

Figure 6:
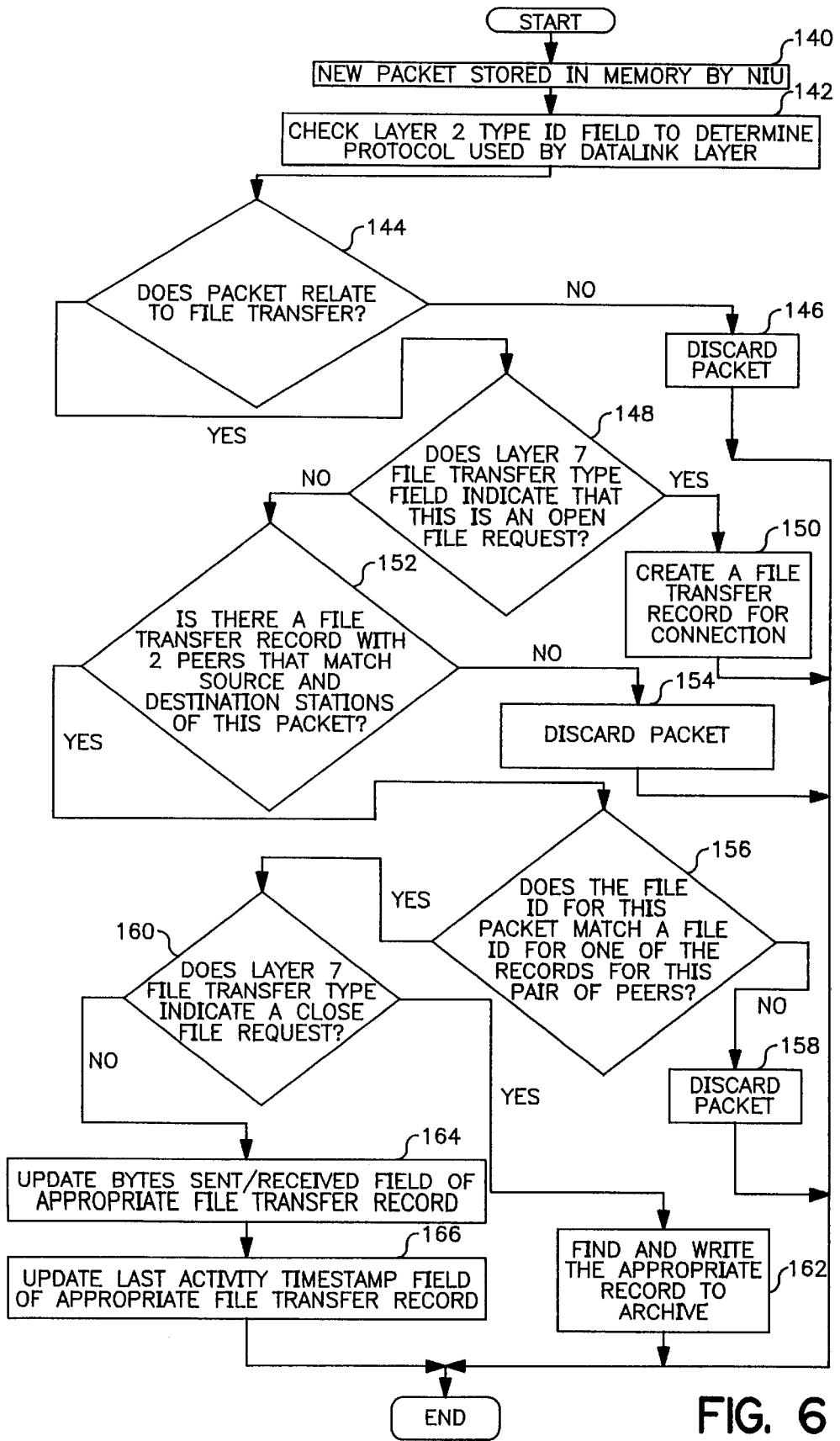
FIG. 6 is a detailed flow diagram of an application management engine.

Given this basic understanding of the function of AME 81, consider now in greater detail how AME 81 achieves its function. FIG. 6 illustrates in flow diagram form the function of AME 81. As mentioned previously, AME 81 begins it analysis of the PCI 42 of a packet upon receipt of a new packet from NIU 80, as shown in step 140. AME 81 first examines the type field within the layer 2 information in step 142 to determine the protocol used in layer 3. The protocol used by layer 3 may determine the location within the packet at which information related to file transfers is stored. All protocols are capable of indicating file transfers. However, each protocol does so using different locations within the layer 3 information, and using different values to indicate a file transfer. For example, in Banyan layer 3 protocol packets, type field 67 indicates whether the packet is a file transfer packet. With other protocols fields in layers 4–7 may have to be examined.

Regardless of the layer 3 protocol used, AME 81 next determines whether the packet relates to a file transfer in step 144. If it does not, AME 81 discards the packet in step 146. Otherwise, AME 81 branches to step 148.

Determining whether the current packet is part of an existing file transfer or the start of a new file transfer is a multistep process that begins in step 148. There AME 81 examines the file transfer type field 74 within the layer 7 information 72 of the packet and compares it to the value representative of an open file request. If the layer 7 file transfer type field 74 represents an open file request then the packet is the start of a new file transfer. AME 81 responds by branching to step 150 to create a new file transfer record 91 for the file transfer. If not, AME 81 branches to step 152.

In step 152, AME 81 begins a search of file transfer database 90 to determine whether the packet is part of an existing file transfer. AME 81 first compares the source and destination identifier fields 61 and 62 of layer 21 information 60 of the packet with the peer A and peer B station identifier fields 91a and 91b of each file transfer record 91. If no records 91 can be found containing peer station identifiers 91a and 91b matching the source and destination station identifiers 61 and 62 then the packet is part of an ongoing file transfer, the start of which network monitor 28 missed. AME 81 proceeds to step 154, where AME 81 discards the packet. On the other hand, if file transfer records 91 are found that identify peer stations matching the source and destination stations of the packet, AME 81 advances to step 156.

The file identifier fields 91g of the file transfer records 91 previously selected in step 162 are examined in step 156. The packet is definitely part of an existing file transfer if an file transfer record is located including a file id 91g matching the file transfer id field 75 of the packet. AME 81 responds by branching to step 160. If no file transfer record 91 includes a file identifier 91g matching the file transfer id field 75 of the packet, AME 81 proceeds to step 158 to discard the packet.

In step 160 AME 81 compares the layer 7 file transfer type field 74 to a value representative of close file request. If the two values are equal, the packet being analyzed represents the end of the file transfer. AME 81 responds to the close file request by branching to step 162. There the appropriate file transfer record 91 is located updated and sent to the archive. On the other had, if file transfer type field 74 does not indicate a close file request, then AME 81 branches to step 164 to begin updating the file transfer record 91 for the file transfer which the current packet is part of.

AME 81 updates the bytes sent/received field 91f in step 166 by the number of bytes of data associated with the packet. AME 81 next updates the last activity timestamp field 91e for the appropriate file transfer record 91 in step 168. Its analysis of the packet complete, in step 170 AME releases control of the workstation's microprocessor and awaits receipt of another packet.

Figure 7:
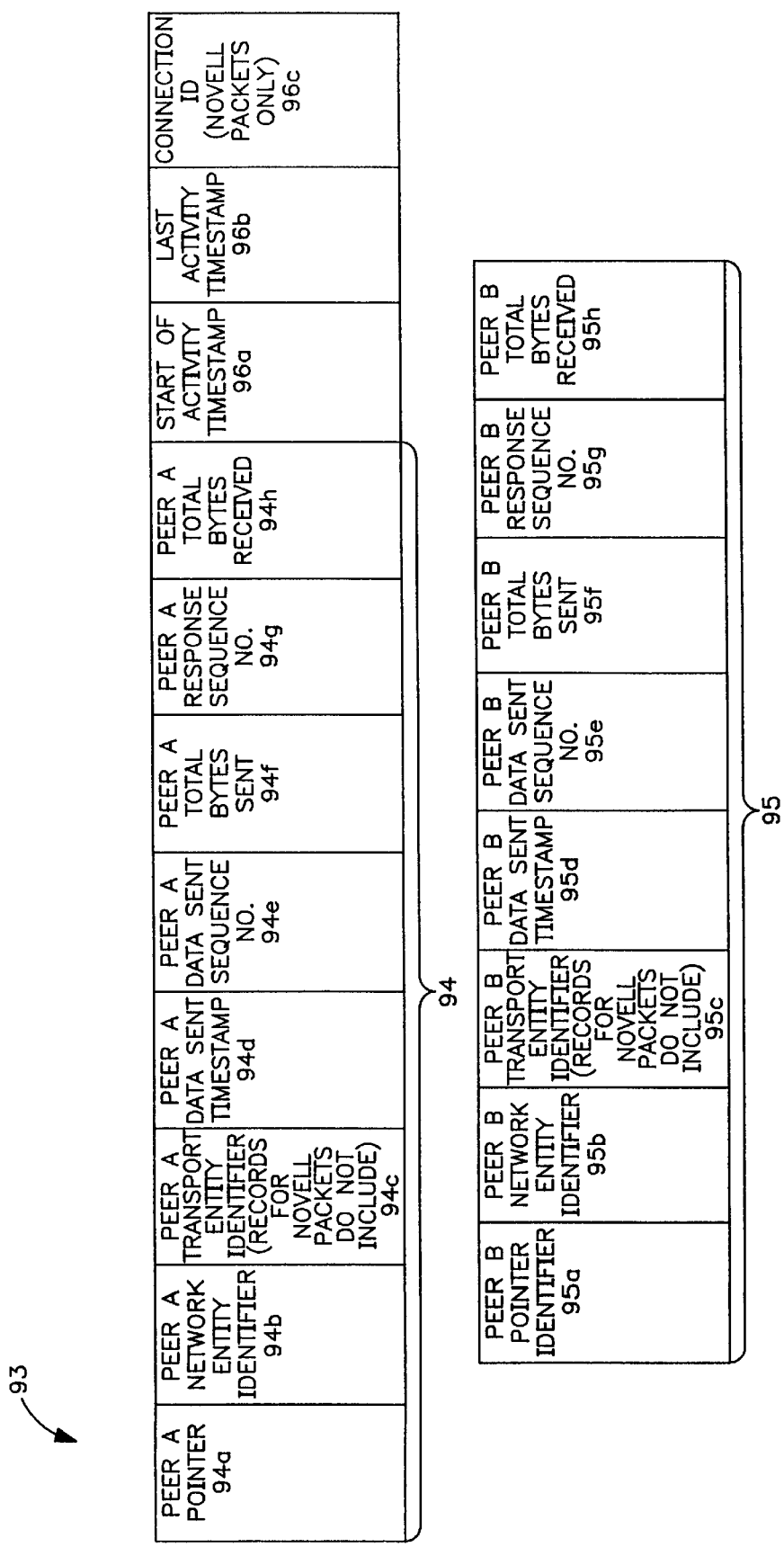
FIG. 7 is a diagram of a connection record.

In contrast to AME 81, which tracks only those connections involving file transfers, CME 83 tracks all logical connections within network 20. CME 83 is thus aware of all exchanges of information via network 20, rather than just exchanges involving file transfers. To monitor logical connections, CME 83 uses a connection record 93 that differs from file transfer record 91. As shown in FIG. 7, each connection record 93 includes three groups of information: information about peer A 94, information about peer B 95, and connection information 96.

Similar information is kept for both peer stations. Thus, the following discussion of peer A information 94 applies equally to peer B information 95. Peer A information 94 includes peer A pointer field 94a. Field 94a identifies one of the stations engaged in the logical connection using a four byte wide pointer into station database 88. Field 94b identifies the network entity, within peer A, that is participating in the logical connection. As with the application record 91, field 94b points into application database 86. The next field 94c indicates the transport entity being used by peer A. Field 94c is not included in connection records 93 for those connections using the Novell protocol. In addition to identifying the various peer A entities involved in the logical connection, peer A information 94 also includes data about packets sent and received by peer A. Fields 94d, 94e, and 94f all relate to packets sent by peer A. Field 94d stores a timestamp representing the last time at which peer A sent a packet to peer B. Field 94e identifies the sequence number of that last packet, while field 94f tracks the total number of bytes that peer A has sent. Fields 94g and 94h relate to packets received by peer A. The sequence number of the last acknowledgment packet received by peer A is identified in field 94g. Field 94h tracks the total number of bytes of data that have been received by peer A.

Connection information 96 may include up to three fields. Field 96a is a timestamp recording the time at which the connection began. The second timestamp, stored in field 96b, indicates the time of last activity. The last activity timestamp is updated whenever a packet is sent or received by either of the peer stations. Connection information 96 includes a connection identifier 96c only when the peer stations are utilizing the Novell protocol. This identifier uniquely identifies the connection. In other words, connection identifier compensates for not identifying transport entities.

Figure 8A:
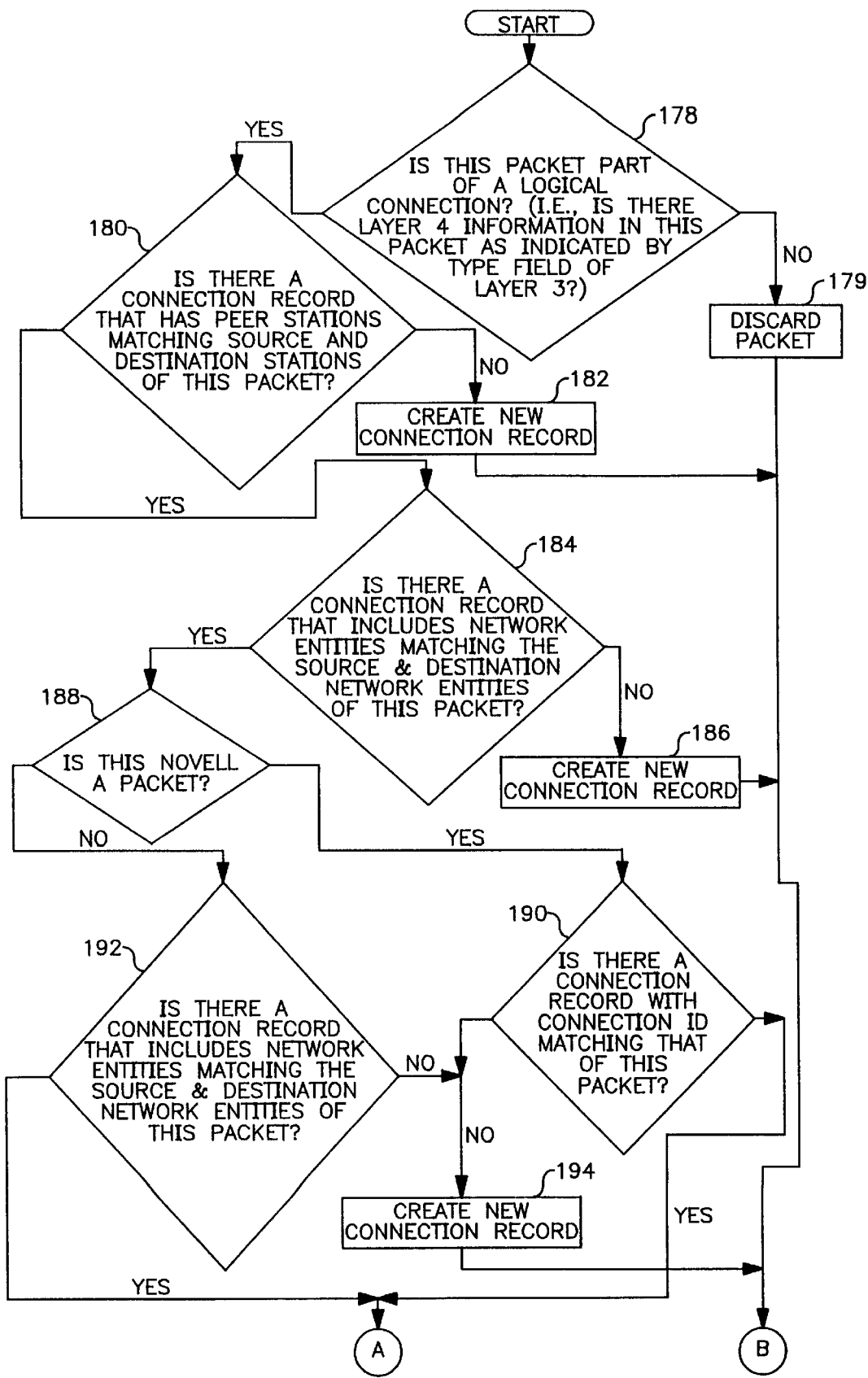
FIGS. 8A and 8B are flow diagrams of a connection management engine.
Figure 8B:
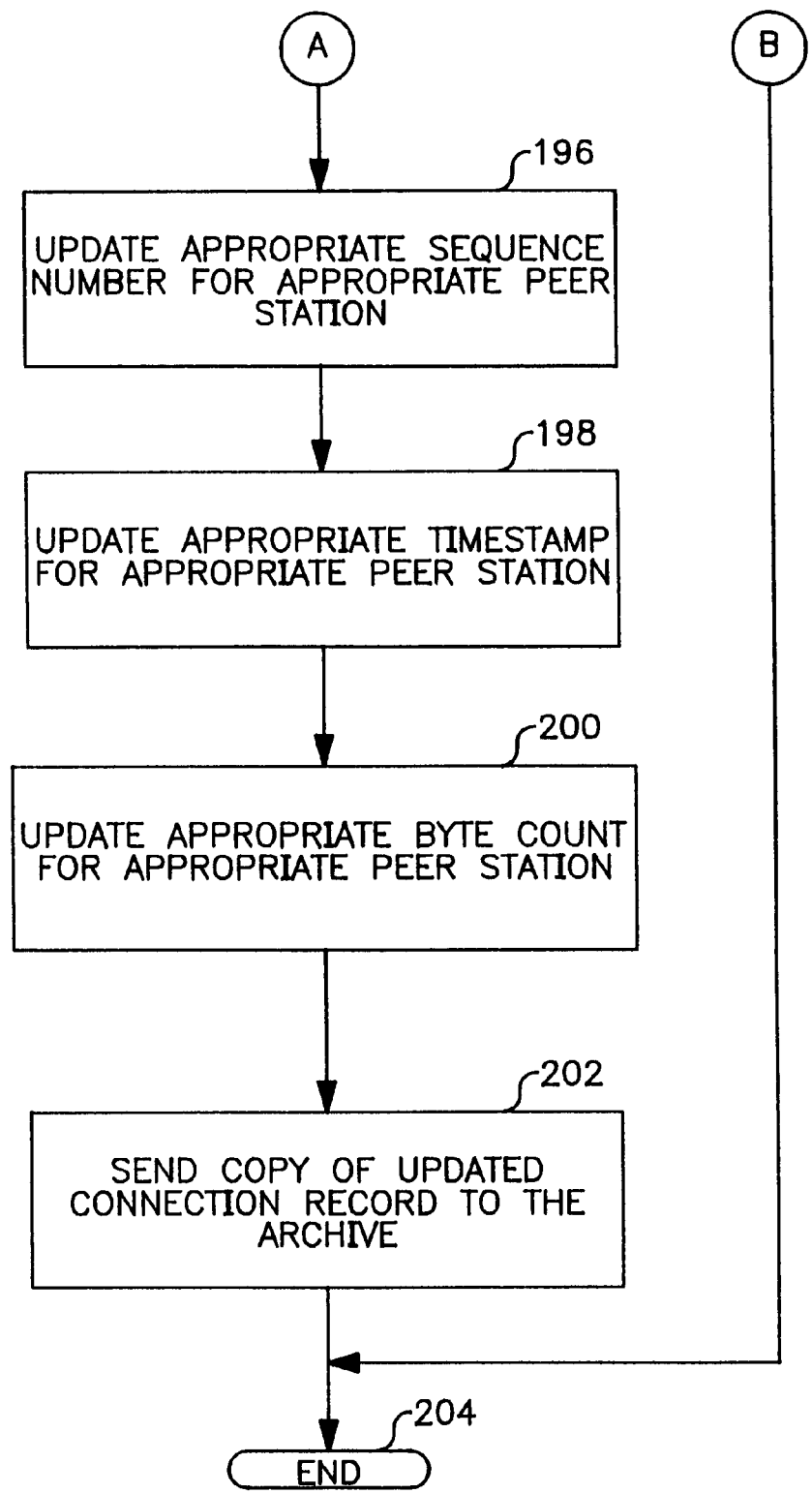

Given the previous discussion of the function of CME 83 and the information gathered by it and stored in connection records 93, consider now how CME 83 achieves its function. FIG. 8 illustrates this in flow diagram form. CME 83 responds to receipt of a packet from network interface unit 80 by branching to step 175.

CME 83 first determines whether the packet is part of a logical connection. CME 83 makes this determination by examining type field 67 of layer 3 information 64. If type field 67 indicates that layer 4 information 69 is present in the packet, then the packet is part of a logical connection. If so, then CME 83 branches to step 180 to begin classifying the packet as the new logical connection or part of an ongoing, existing logical connection. CME 83 simply ignores, or discards, those packets that are not part of a logical connection. In step 180, CME 83 begins classifying the logical connection by identifying the two stations involved in the connection. CME 83 does so by reading the source and destination station identifier fields 61 and 62 in layer 2 information 60. These are then compared to the peer station id fields 94a and 95b of each connection record 93. If no connection record 93 is located with peer stations matching the source and destination stations, then the packet is either the start of a new logical connection, or part of a logical connection the start of which CME 83 missed. In either case, CME 83 responds by branching to state 182 to create a new connection record 93 for the logical connection. Otherwise, CME 83 advances to step 184.

In step 184 CME 83 continues its effort to determine whether the packet just received is part of a new logical connection or part of an existing logical connection. CME 83 does so by further scrutinizing the connection records 93 previously identified in step 180. The peer A and peer B transport network entities identified by fields 94*b* and 95*b* in each connection record 93 are compared to the source and destination network entities identified in fields 65 and 66 of the packet. If no record 93 is a match, CME 83 creates a new connection record 93 by branching to step 186. On the other hand, if any record 93 is a match, CME 83 branches to step 188.

In step 188 CME 83 determines what information is necessary to complete the identification of the packet as part of an existing logical connection. CME 83 does so by identifying whether the packet uses a Novell protocol. If so, then a connection id is needed and CME 83 advances to step 190. For all protocol types other than Novell, classification of the logical connection as new or not requires source and destination transport entity identifiers of fields 70 and 71. CME 83 branches to step 192 from step 188 for a packet using a protocol other than Novell.

During step 190 CME 83 locates the connection id field 78 within the packet's PCI 42. This is then compared to the connection id fields 91 of connection records 93 selected in step 184. The packet is the start of a new logical connection if none of the connection records 93 includes a connection id field 96*c* matching the connection id field of the PCI 42. CME 83 responds to this situation by branching to step 194 to create a new connection record 93. On the other hand, the packet is part of an existing logical connection if a connection record 93 selected in step 184 includes a connection id field 96*c* matching that of the packet. In this case, CME 83 branches to step 196 to begin updating the connection record 93 associated with the packet.

For non-Novell packets CME 83 is finally able to identify whether the packet is part of an existing logical connection by comparing the source and destination transport entities identified in fields 70 and 71 of PCI 42 to the transport entities identified in fields 94*c* and 95*c* of the connection records 93 selected in step 184. The packet is the start of a new logical connection if no match is found. CME 83 creates a connection record 93 for the new logical connection in step 194. If a match is found during step 192, then CME 83 branches to step 196 to update the connection record 93 just identified.

CME 83 places the packet in context in steps 196–200 by updating the record 93 for the logical connection associated with the packet. CME 83 starts in step 196 by storing the sequence number stored within the packet in the appropriate field. To do so, CME 83 must determine whether or not the packet is an acknowledgment or a transfer, and which peer is the source station. For example, if the packet is an acknowledgment by peer B of receipt of a packet from peer A, then field 94*g* is changed to the sequence number stored within the packet. On the other hand, if the packet is a transfer of data by peer B, then field 95*e* is changed to the sequence number stored within the packet.

CME 83 updates the appropriate timestamp fields in step 198. Last field activity timestamp field 96*b* is revised by CME 83 to reflect the current time. One of the data sent timestamp fields 94*d* or 95*d* may also be revised if the packet is not an acknowledgment packet.

CME 83 completes its updating of connection record 93 in step 200 by updating appropriate byte count fields for the logical connection's connection record 93, provided that the packet is not an acknowledgment. For example, if peer B transmits data to peer A, then peer A total bytes received field 94*h* and peer B total bytes sent field 95*f* are both increased by the number of bytes of data associated with the packet. Similarly, if the packet transmits data from peer A to peer B then CME 83 increases both peer total bytes sent field 94*f* and peer total bytes sent field 95*h* by the number of bytes of data associated with the packet. Updating of the relevant record complete, CME 83 advances to step 202.

CME 83 performs one last task in step 202. CME 83 sends a copy of the revised connection record 93 to the archive. This allows dynamic display of connection activity. Analysis of the packet complete, CME 83 branches to step 204.

Thus, methods of monitoring both local connections and file transfers in a computer network have been described. Both methods analyze packets in the context of earlier packets pertaining to the same connection. A new record is created when a packet is the start of a new connection. The record for a connection is updated in light of a new packet in the ongoing connection. Apparatus for monitoring logical connections and file transfers have also been described.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer-implemented method comprising:
   a) determining if a packet represents a part of a file transfer;
   b) if the packet represents a part of a file transfer:
      1) determining if the packet is part of a new file transfer or a one of a third multiplicity of existing file transfers;
      2) creating a new record if the packet is part of the new file transfer;
      3) if the first packet is a part of one of the third multiplicity of existing file transfers:
         A) locating a first existing record in a file transfer record database for the existing file transfer which the packet is part of;
         B) updating a second timestamp of the first existing record to a value representative of a current time;
         C) updating a total number of bytes exchanged by a number of bytes of user data associated with the packet.

2. The method of claim 1 wherein the protocol control information of the packet including a first type field, and wherein the step of determining whether the packet represents a part of a file transfer comprises the steps of:
   a) comparing a first value of the first type field to a second value representative of file transfer; and
   b) identifying the packet as part of a file transfer if the first value and the second value are equal.

3. The method of claim 1 wherein the step of determining if the packet is part of a new file transfer comprises the steps of:
   a) comparing the source station identifier and the destination station identifier of the protocol control information to the pair of stations identified in each record; and b) identifying the packet as part of the new file transfer if there is no record in the file transfer record database identifying a pair of stations matching the source station and the destination station identifiers of the protocol control information.

4. The method of claim 3 wherein the protocol control information of the packet includes application layer information, the application layer information including a second type field, and wherein determining whether the packet is part of a new file transfer further comprises the step of:

a) comparing a third value of the second type field of the application layer to a fourth value representative of an open file request; and b) identifying the packet as part of the new connection if the third value equals the fourth value.

5. The method of claims 1 wherein the step of creating a new record comprises the steps of:

a) storing a first value representative of the source station identifier of the packet;

b) storing a second value representative of the destination station identifier of the packet;

c) storing the total number of bytes of user data associated with the packet.

6. The method of claim 1 wherein the computer network includes a station database identifying each station in the computer network and wherein the first value representative of the source station identifier is a first pointer into the station database.

7. The method of claim 6 wherein the second value representative of the destination station identifier is a second pointer into the station database.

8. A computer-implemented method comprising:

a) determining if a packet represents a part of a file transfer by comparing a first value of a first type field to a second value representative of file transfer;

b) discarding the packet if the packet is not part of a file transfer;

c) identifying the packet as part of a new file transfer by comparing a third value of a second type field to a fourth value representative of an open file request;

d) creating a new record for file transfer associated with the packet if a third value equals the fourth value;

e) if the third value does not equal the fourth value searching a file transfer record database for a first set of records including a pair of station identifiers matching a source station identifier and a destination station identifier of the packet;

f) creating a new record for the packet if no record is found including a pair of station identifiers matching the source station identifier and the destination station identifier of the packet;

g) if the first set of records are found, searching the first set of records for a desired record having a file transfer id matching a one of a source network entity identifier and a destination network entity identifier of the packet;

h) creating a new record for the packet if no record is found including a file transfer matching one of the source network entity identifier and the destination network entity identifier of the packet; and i) if a desired record is located, updating a second timestamp of the desired record to a value representative of a current time and updating a total number of bytes exchanged by a number of bytes of user data associated with the packet.

9. The method of claims 8 wherein the step of creating a new record comprises the steps of:

a) storing a first value representative of the source station identifier of the packet;

b) storing a second value representative of the destination station identifier of the packet;

c) storing an applications program identifier representative of a one of the source network entity identifier and the destination network entity identifier of the packet;

d) storing a file transfer id representative of the file transfer id of the packet; and e) storing the total number of bytes of user data associated with the packet.

10. The method of claim 8 wherein the computer network includes a station database identifying each station in the computer network and wherein the first value representative of the source station identifier is a first pointer into the station database.

11. The method of claim 10 wherein the second value representative of the destination station identifier is a second pointer into the station database.

12. The method of claim 8 wherein the computer network includes an applications program database identifying each applications program operating in the computer network, and wherein the applications program identifier is a third pointer into the applications programs database.

* * * * *